United States Patent
Hassan et al.

(10) Patent No.: US 10,499,260 B2
(45) Date of Patent: Dec. 3, 2019

(54) ADAPTIVE PROFILES WITH SDR

(71) Applicant: Microsoft Technology Licensing, LLC, Redmond, WA (US)

(72) Inventors: Amer Hassan, Kirkland, WA (US); Paul Mitchell, Seattle, WA (US); Aaron Cunningham, Redmond, WA (US); Mitesh Desai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/991,809

(22) Filed: Jan. 8, 2016

(65) Prior Publication Data
US 2017/0201895 A1  Jul. 13, 2017

(51) Int. Cl.
*H04B 15/00* (2006.01)
*H04B 17/00* (2015.01)
(Continued)

(52) U.S. Cl.
CPC .......... *H04W 24/02* (2013.01); *H04B 1/1027* (2013.01); *H04L 1/0041* (2013.01); *H04L 67/303* (2013.01); *H04W 88/06* (2013.01)

(58) Field of Classification Search
CPC . H04W 24/10; H04W 52/243; H04W 72/082; H04W 72/0453; H04W 16/14;
(Continued)

(56) References Cited

U.S. PATENT DOCUMENTS

| | | |
|---|---|---|
| 6,788,253 B1 | 9/2004 | Calin |
| 7,424,268 B2 * | 9/2008 | Diener ................ H04L 1/0001 370/241 |

(Continued)

FOREIGN PATENT DOCUMENTS

| | | |
|---|---|---|
| WO | 2014158131 A1 | 10/2014 |
| WO | 2014176503 A1 | 10/2014 |

OTHER PUBLICATIONS

"International Search Report and Written Opinion Issued in PCT Application No. PCT/US2016/069354", dated Mar. 23, 2017, 13 Pages.

(Continued)

*Primary Examiner* — Gary Lafontant
(74) *Attorney, Agent, or Firm* — Ray Quinney & Nebeker, P.C.; Thomas M. Hardman; Gregg W. Wisdom

(57) ABSTRACT

Methods and apparatus in a wireless network that allow devices, such as client devices and access points (APs), having software defined radios (SDRs) to change operating behavior depending on network RF environment conditions are disclosed. The devices may be instructed to operate according to differently defined behavior profiles that may be chosen based on RF environment conditions. The profiles may be stored in a database. A particular profile may be obtained from the database for one or more devices based on an interference level within an RF environment of the devices. The profiles may be implemented to change device operating behavior so that interference is reduced or minimized in higher levels of interference. The profiles may also be implemented to change device behavior so that interference is reduced in lower levels of interference while also freeing up resources for more efficient use in network during lower levels of interference.

16 Claims, 4 Drawing Sheets

(51) Int. Cl.
*H04W 24/02* (2009.01)
*H04L 29/08* (2006.01)
*H04L 1/00* (2006.01)
*H04B 1/10* (2006.01)
*H04W 88/06* (2009.01)

(58) Field of Classification Search
CPC .... H04W 88/06; H04L 27/2662; H04L 5/006; H04L 1/0003; H04B 17/345; H04B 7/18543
See application file for complete search history.

(56) References Cited

U.S. PATENT DOCUMENTS

| | | | |
|---|---|---|---|
| 7,764,798 | B1 | 7/2010 | Prather et al. |
| 8,340,580 | B1 | 12/2012 | Epstein |
| 8,379,551 | B2 | 2/2013 | Wietfeldt et al. |
| 8,483,740 | B2* | 7/2013 | Somasundaram .... H04W 52/04 455/522 |
| 8,599,709 | B2 | 12/2013 | Chen et al. |
| 9,071,343 | B2 | 6/2015 | Abdelmonem |
| 2002/0155811 | A1 | 10/2002 | Prismantas et al. |
| 2009/0280794 | A1* | 11/2009 | Desruelle ............ H04L 41/0226 455/419 |
| 2010/0008244 | A1 | 1/2010 | Sampath |
| 2012/0164948 | A1 | 6/2012 | Narasimha et al. |
| 2012/0170457 | A1* | 7/2012 | Zdarsky .............. H04L 12/5692 370/232 |
| 2013/0023216 | A1 | 1/2013 | Moscibroda et al. |
| 2013/0272260 | A1 | 10/2013 | Bitran et al. |
| 2013/0315198 | A1* | 11/2013 | Krishna Kumar .... H04L 1/0009 370/330 |
| 2014/0071845 | A1 | 3/2014 | Banerjee et al. |
| 2014/0126345 | A1* | 5/2014 | Ohana .................. H04L 1/0009 370/203 |
| 2015/0056931 | A1 | 2/2015 | Yerramalli et al. |

OTHER PUBLICATIONS

"Configuring Adaptive Radio Management (ARM) Profiles and Settings", Published on: May 1, 2015 Available at: http://community.arubanetworks.com/aruba/attachments/aruba/unified-wired-wireless-access/7592/1/ARM%20Doc%20Supplement.pdf.

MAC Profile Adaption in cognitive Radio Networks: An Experimental Study, Kuo-Chun Huang, Xiangpeng Jing and Dipankar Raychaudhuri Hu; Proceedings of 18th International Conference on Computer Communications and Networks, 2009. ICCCN 2009. pp. 1-6.

"Second Written Opinion Issued in PCT Application No. PCT/US2016/069354", dated Sep. 25, 2017, 7 Pages.

"International Preliminary Report on Patentability Issued in PCT Application No. PCT/US2016/069354", dated Dec. 20, 2017, 9 Pages.

* cited by examiner

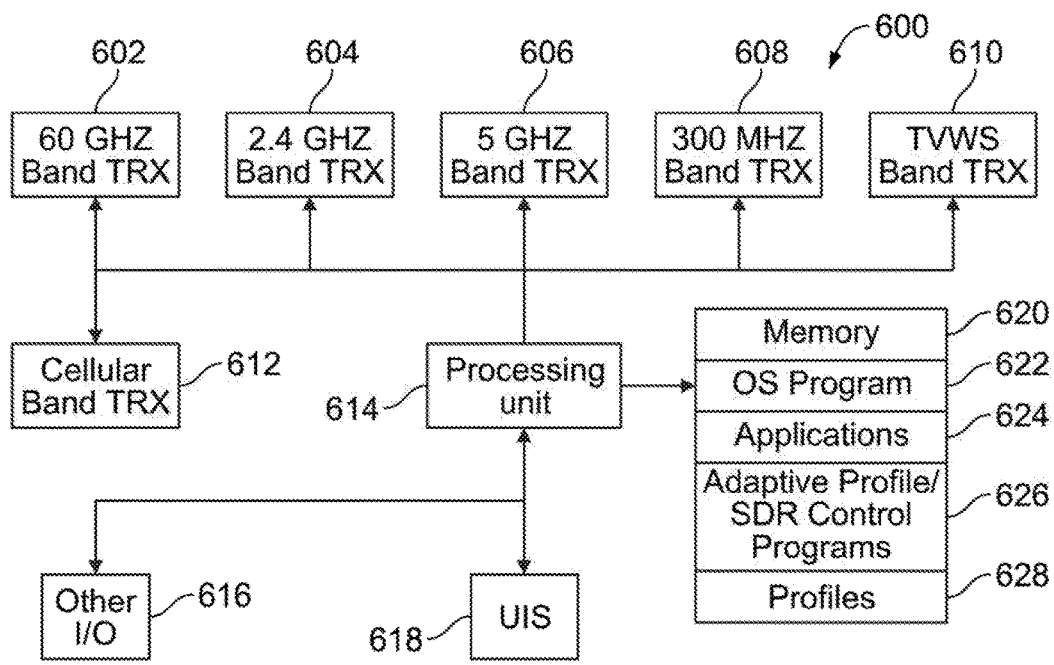
FIG. 6
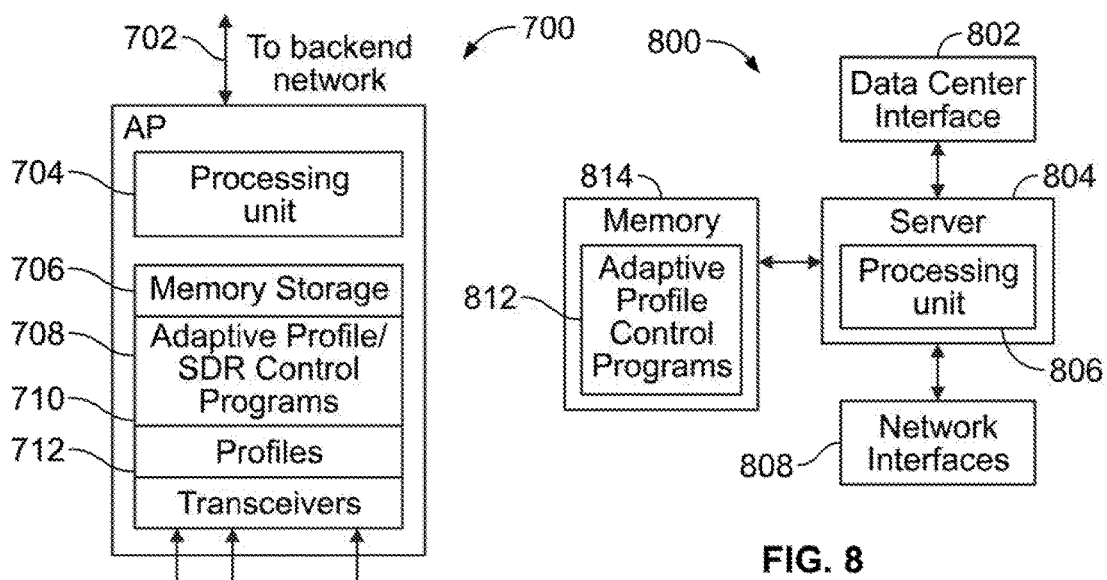
FIG. 7
FIG. 8

ADAPTIVE PROFILES WITH SDR

BACKGROUND

Wireless communications systems that use certain unlicensed frequency bands for transmission have proliferated. For example, Wi-Fi networks that operate using unlicensed frequency bands in the 2.4 or 5.0 GHz frequency range are now used by a majority of businesses and public/private organizations as wireless local area networks (WLANs).

Because there are no restrictions on the types of systems that may use these unlicensed frequency bands, this proliferation of systems has resulted in greater potential for interference to exist in the RF environments of the wireless systems that operate in these frequency bands. As one example of potential for interference in unlicensed frequency bands, service providers have implemented Long Term Evolution (LTE) networks that may transmit on what are known as the LTE-Unlicensed (LTE-U) channels. The LTE-U channels are in the same 5 MHZ frequency bands that are specified by IEEE 802.11 for use by Wi-Fi networks. Because the LTE systems transmit at high power levels and may acquire and hold the 5 MHZ channels for long periods of time, the LTE networks may cause severe interference on the Wi-Fi networks. For example, Wi-Fi networks currently operate using a feature that backs off packet transmission frequency by a transmitting device during the presence of interference to avoid errors in transmissions. The persistent interference from an LTE system transmitting in the LTE-U band may cause a Wi-Fi device to back off packet transmissions and remain backed off so that the transmissions are substantially interfered with and data throughput becomes unacceptable.

In general, the increasing use of systems and networks such as business WLANs, public hotspots, home media devices, LTE networks using the LTE-U band, and other wireless devices and networks, has potential to increase interference levels and interfere with transmission in co-existing wireless networks that use the same frequency bands or adjacent frequency bands.

SUMMARY

This summary is provided to introduce a selection of concepts in a simplified form that are further described below in the Detailed Description. This summary is not intended to exclusively or exhaustively identify key features or essential features of the claimed subject matter, nor is it intended as an add in determining the scope of the claimed subject matter.

Embodiments of the disclosure provides a method and apparatus in a wireless network that allows devices, such as client devices and access points (APs), having software defined radios (SDRs) to change operating behavior depending on network RF environment conditions. The devices and APs may be instructed to operate according to differently defined behavior profiles that may be chosen based on network RF environment conditions. The profiles may be stored in a database and a particular profile may be obtained from the database for one or more devices based on an interference level within an RF environment in which the one or more devices operates. The profiles may be implemented to change device operation behavior so that interference effects on operating devices is reduced or minimized at higher levels of interference. The profiles may also be implemented to change device behavior so that interference on the operating devices is reduced in lower levels of interference while also freeing up resources for more efficient use by the operating devices in the network during the lower levels of interference. The embodiments may include, for example, instructing client devices and APs to use different MAC profiles, instructing the client devices and APs to modify baseband transmission by using a new forward error correction (FEC) code, or instructing the client devices and APs to adapt RF baseband signaling by using certain bandwidths for transmission channels. Modifications to the profile may also include changing back-off behavior of a client device.

In an embodiment, a controller in a network may instruct devices including Wi-Fi client devices and APs by initiating the sending of an executable file that includes profile code for changing operating behavior of the Wi-Fi client devices or APs. The controller may initiate the sending of the profile code upon a determination being made that interference exists in the Wi-Fi network at or approaching a level that triggers a need for profile change. The executable files comprising the profiles may be downloaded from the cloud by the controller from a central database. The profiles may be categorized in the central databases for use depending on network RF conditions. Particular profiles sent to the client devices or APs may be selected by the controller from categories based on the Wi-Fi network RF environment as determined by the controller. Measurements of the RF environment for interference determination may be performed by the Wi-Fi client devices or by APs in the network. In some implementations the controller may handle areas covered by particular APs, or areas covered by particular multiple APs, within a network differently. For example, the controller may determine that interference requiring profile modification exists in one particular section of a network and initiate sending of modified profiles only to APs or client devices operating in that particular section of the network.

In an embodiment the controller of the Wi-Fi network determines that measured interference is at a selected level in an RF environment of the network in which at least one device is operating according to a current profile. The at least one device may be a client device or an AP. The selected level of interference may be any level that triggers the initiation of actions for utilizing a different MAC profile for the at least one device. The selected level of interference may be determined based the current profile. In one implementation, the selected level may be defined to include any level of measurement of interference that falls outside a range of interference associated with the current profile. For example, the current profile may be associated with a range of interference between values $x_1$ to $x_2$. If the measured interference is outside the range, i.e., is at a selected level, which may include values above or below the range for the current profile, then the controller initiates actions for determining a different MAC profile that has a range in which the selected level of interference falls. Each profile may have a range of interference values with which it is associated. The controller may make the determination that measured interference is at a selected level based on received measurements from one or more network APs, one or more client devices, or a combination of APs and client devices. In another implementation, the controller may receive interference measurements from dedicated measurement devices in the network.

The controller may access a Data Center that maintains a database of MAC profile modifications or new MAC profiles that are categorized based on a particular classification using ranges of interference levels or interference levels. Appropriate selection of a MAC profile or modified MAC profile may be performed based on the profile categorizations and the measured level of interference. The data base may be included in a data center in the cloud and available to controllers of multiple networks. The controller may initiate the sending of the new profile code to APs and/or client devices by initiating the sending of an executable file downloaded from the database. In an implementation profile, modifications or new profiles may be defined based on keeping fixed AP channels. As one example alternative to defining changes in the network MAC layer, new profiles or profile modifications may include changes to the baseband, for example, changes to the forward error correction (FEC) coding scheme that is used for AP or device transmissions. As another implementation, profile modifications may include changing client device Wi-Fi back-off behavior.

Example implements of the solution in a network such as a Wi-Fi network may include separately implemented servers or computer devices comprising a controller and a data center having a database of profiles. Alternately, all of the controller may be implemented in a device, such as a client device or AP. Portions of the controller functions may also be implemented in one or more devices, such as a server, APs, or client devices operating within the network. The data center may also be implemented in one device such as a server, computer device, a client device or AP. Portions of the controller functions may also be implemented in one or more devices operating within or remote from the network. In one implementation a Regional Data Center may serve to maintain a database of profiles for use by controllers in multiple networks. The Regional Data Center may include a database of profiles that may be maintained and updated according to standards organizations' inputs on changing technical specifications or inputs based on technical research on RF environments as RF environments in the region change.

BRIEF DESCRIPTION OF THE DRAWINGS

FIG. 6 is a simplified block diagram showing an example client device for operation with modified profiles;

FIG. 7 is a simplified block diagram showing an example access point for implementing profile modification; and, FIG. 8 is a simplified block diagram showing an example controller for implementing profile modification.

DETAILED DESCRIPTION

Figure 1:
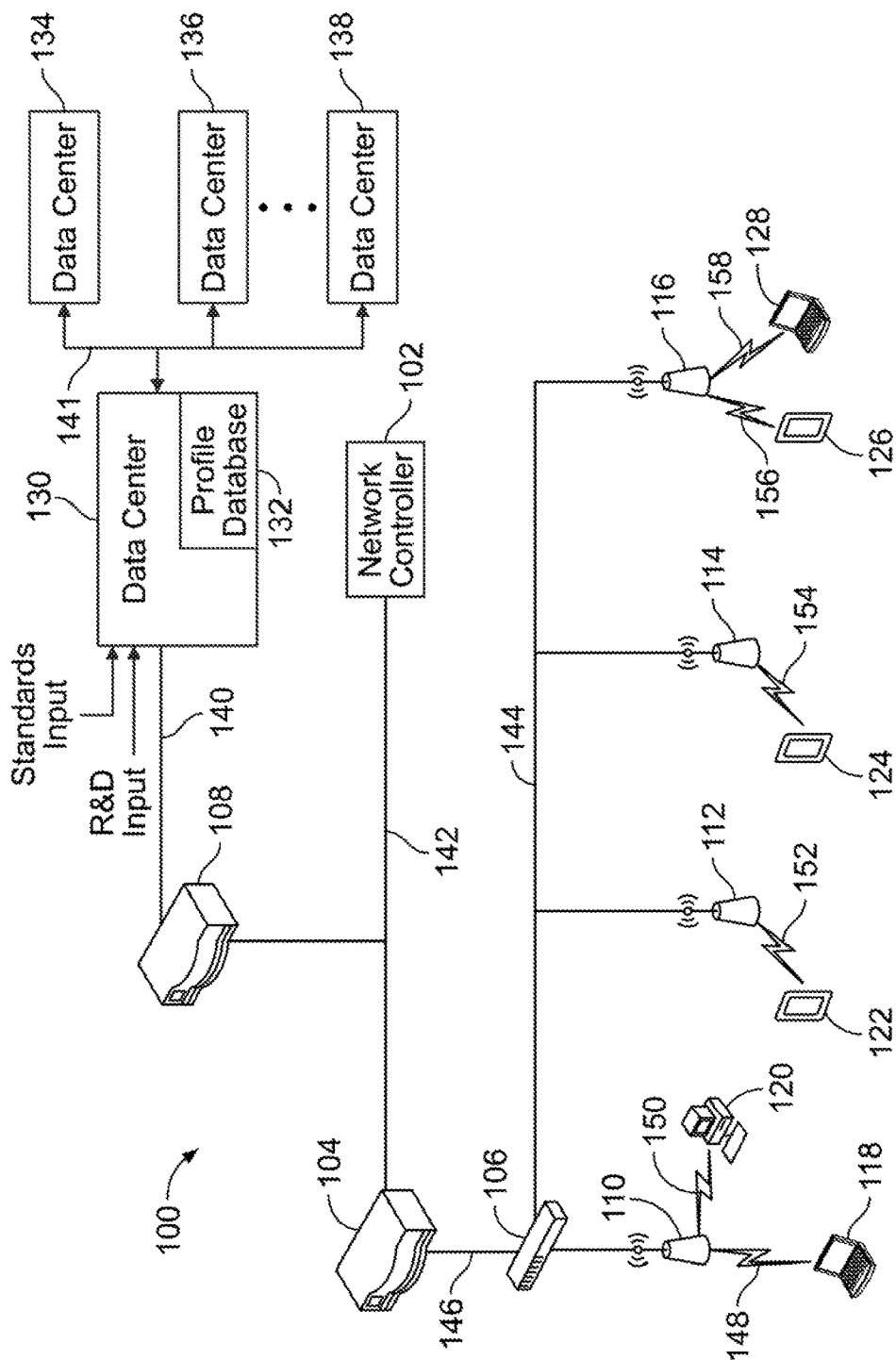
FIG. 1 is a diagram illustrating a system according to an embodiment of the disclosure.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus for adaptive profile control of software defined radios (SDRs) in wireless networks. The adaptive profile control allows SDRs of devices within a wireless network to be managed by adapting operating behavior profiles according to RF environment conditions.

Use of the embodiments provides numerous technical advantages. For example when interference in a network increases to a level at which interference and network quality/performance become unacceptable, new device profiles for devices such as client devices or access points (APs) may be implemented in place of current profiles of the devices operating in the increased interference. The new device profiles may be configured for providing an acceptable network quality/performance at the current increased level of interference. These device profiles may also be configured to provide the most efficient use of RF resources possible while still providing acceptable quality/performance at the increased interference. If the interference in the network decreases to a level at which interference and network quality/performance are in a range below the range for which the current device profiles are configured to provide an acceptable network quality/performance, new device profiles may be implemented in place of current profiles of the devices operating in the decreased interference. These new device profiles may be configured for providing an acceptable network quality/performance at the current decreased level of interference. The new profiles for the decreased interference level may be configured to be less RF resource demanding. Providing a database of a plurality of profiles that are each associated with a level, or range of levels, of interference values allows a network controller to adapt device profiles as interference increases and decreases in the RF environment of the network. When interference is at lower levels, the embodiments allow the situation to be taken advantage of by adapting device profiles so that network devices use less RF resources while still maintaining an acceptable level of performance. The network may also have more capacity for additional traffic at the lower interference levels. When interference is at higher levels, the embodiments allow the performance of the network devices to be maintained at an acceptable level by adapting device profiles. In an implementation, use of predefined profiles stored in a database allows the profiles to be standardized. The predefined profiles may be distributed to dispersed networks for use as adaptive profiles. The predefined profiles may also be created through research and development that may be specifically targeted to the RF environments of the networks accessing the profiles.

Use of the embodiments also provides technical advantages in that the adaptive profile functions may be configured to handle different network RF environments in areas covered by particular APs, or areas covered by particular multiple APs, within the network separately. For example, it may be determined that an increased interference level requiring profile modification exists only in the RF environment of one particular section of the network. The sending of modified profiles only to APs or client devices operating in that particular section of the network may then be initiated. This implementation allows interference that only affects one portion of the network to be managed by implementing new device profiles in only that portion of the network. This allows devices in other portions of the network to keep using their current profile which may consume less RF resources. In this type of situation, if devices in other portions of the network are allowed to keep using their current profiles, which are configured for a lower level of interference and use less RF resources, overall interference within the network may be reduced.

The adaptive profiles of the embodiments also allow network to keep a fixed channel assignment for APs in the network by providing adaptive profiles that modify device behavior to account for interference but maintain a fixed channel assignment in the network. This allows fixed channel assignments between APs within the network and between neighboring networks. The ability to keep fixed channel assignments may reduce interference between APs within a network and between neighboring networks caused by switching channels to reduce interference.

Referring now to FIG. 1, therein is a simplified diagram of an example system in which embodiments of the disclosure using adaptive profiles with software defined radios (SDRs) may be implemented. The system includes wireless network 100, which may be, for example, a local area network (WLAN). Network 100 includes router 108, access point gateway 104, controller 102, switch 106, and access points, 110, 112, 114, and 116. Router 108, access point/ gateway 104, network controller 102, and switch 106 may be configured to provide traffic routing and switching functions for traffic to and from the access points 110, 112, 114 and 116 over the infrastructure. Client devices 118-128 are shown operating within the coverage area of network 100 and communicating with a nearby access point of access points 110, 112, 114 or 116 over communication links 148-158. In the example implementation of FIG. 1, client devices 118-128 and APs 110-116 may include software defined radio (SDR) capability. The SDR capability allows client devices 118-128 and APs 110-116 to be configurable to operate according to different behavior profiles that define different control features and parameters for sending and receiving data transmissions in network 100.

In the example implementation of FIG. 1, one or more of client devices 118-128 may be mobile and may be operable to communicate with both of network 100 and at least one other different type of network, such as a cellular network. In alternative embodiments network 100 may also support devices of client devices 110-116 that operate only in network 100. Network 100 may be a private business network, a network implemented for a commercial/retail, or any other type of wireless network. FIG. 1 also shows data center 130 that includes profile database 132. Data center 130 is shown as located remotely from network 100 and communicating with network 100 over interface 140. Interface 140 may comprise, for example, interact communication channels. In other implementations data center 100 may be implemented wholly or partially within network 100. For example, in one alternative implementation the functions of data center may be implemented in controller 102. Data center 130 may also communicate with other data centers, such as data centers 134, 136, and 138 that may be located remotely and may comprise data centers that serve one or more other communication networks. Data center 130 may also be configured to receive input, such as standards input or research and development input, that may be used to modify or change profile database 132. The standards or research and development input may be utilized to maintain a profile database that is consistent with changing standards requirements and kept up to date with technical research.

Network controller 102 is illustrated as single functional block but may be implemented in one or more server computers or computing devices. Network controller 102 may be representative of server functions or server systems that may be co-located or geographically dispersed. Network controller 102 may also be located remotely from network 100. Also, while client devices 118-128 are each shown in FIG. 1 as implemented as one of an example smart phone, a tablet computer, a desktop computer, or laptop computer device, each of the example client devices 118-128 may be alternatively implemented as any other type of device, or number of devices, that may be configured with functionality supporting the embodiments disclosed herein. These other types of devices may include, for example, gaming devices, media devices, smart televisions, home theater systems, smart automobile systems, smart house systems, multimedia cable/television boxes, smart phone accessory devices, tablet accessory devices, personal digital assistants (PDAs), portable media players, smart watches, smart sensors, or industrial control systems.

In an example implementation, network 100 may comprise a Wi-Fi network that operates over a range of frequencies on communication links 148-158 according to IEEE 802.11 standards specifications. The frequency range may include frequency bands in the range of 300 MHz to 90 GHz, each according to the 802.11 specification for the particular frequency band. For example, network 100 may include access points 110-116 that each include transceivers operable according to one or more of the 802.11a (5 GHz), 802.11b (2.4 GHz), 802.11g (2.4 GHz), 802.11n (2.4/5 GHz), 802.11ac (5 GHz), 802.11ad (60 GHz), 802.11af (54-698 MHz) (TVWS), or 802.11ah (9 GHz) (Wi-Fi HaLow) standards. The access points 110-116 may be capable of communicating on channels of various bandwidths within the frequency ranges according to the standard being used for the communications. The access points 110-116 may also include transceivers operating in the 300 MHz range. In alternative implementations, network 100 may also operate over any other electromagnetic frequencies, including optical wavelengths, or communication medium, and may include transceivers according to any other standards specifications, including any non-802.11 packet/framing protocols.

Client devices 148-158 may each also be operable as a Wi-Fi client device to communicate with the network access points 110-116 according to one or more of the IEEE 802.11 standards specifications on which the access point operates. Client devices 148-158 may each include one or more applications that communicate data traffic with one of access points 110-116 when in the coverage area of network 100. These applications may include any type of application communicating over network 100, such as client applications communicating with a client application on another device in network 100, or in another network, applications included in the device operating system, applications installed or downloaded to the wireless device 116 by a user, or any other type of function that communicates through network 100. Client devices 118-138 may also include devices communicating directly over a wireless interface with one or more other devices without using access points 110-116. These client devices may include one or more applications communicating over a wireless interface directly with applications in other devices such as, for example, peer to peer or device to device applications. These applications communicating directly with other client devices could include, for example, client devices using the 802.11 2.4 GHz Wi-Fi direct standard for a direct device to device connection.

Figure 2:
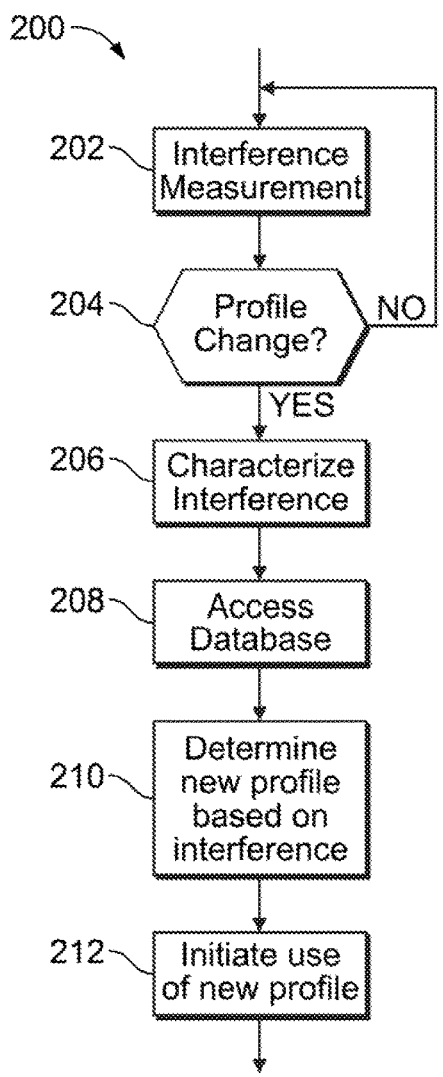
FIG. 2 is a flow diagram showing example operations for modifying profiles in a wireless network according to an implementation of FIG. 1.

Referring now to FIG. 2, therein is a flow diagram 200 showing example operations performed for modifying profiles in a wireless network according to an embodiment. In the process of FIG. 2, devices, such as client devices 118-128 or APs 110-116, that include SDR capability and that are operating in the Wi-Fi network 100, may be instructed to change operating behavior according to different device profiles. The different device profiles may each be associated with different interference levels in the RF environment in wireless network 100.

The process of FIG. 2 begins at 202 where an interference measurement is made in the RF environment of Wi-Fi network 100. At 204, a determination as to whether or not the measured interference is at a selected level that triggers a need for profile change in one or more of devices of client devices 118-128 or APs 110-116. If the detected interference is at a level that does not require profile change, the process moves back to 202 and continues to monitor and measure interference in network 100. If the interference is at a selected level that triggers a need for profile change the process moves to 206.

In various implementations, the selected level of interference may be based on any type of interference measurement, or measurement of signal transmission quality or quality of service (QoS). For example, the selected level of interference may be based on measurements of the duty cycle of interference to obtain an interference metric that indicates the aggressiveness of the interference and that it is from a source outside the network 100. The interference metric may then be used as an interference value in determining if the interference is at a selected level. In another example, an interference tolerance metric associated with several different types of interference measurements may be use as the selected level that triggers profile change. The interference tolerance metric may be a standards-based or proprietary value created from a combination of several different types of measurements that may be combined together to reflect the capability of one or more of client devices 118-128 or APs 110-116 to tolerate the interference currently present in the environment.

In one implementation, a selected level of interference that triggers a need for profile change may be defined to include any measurement value of interference that falls outside an acceptable range of interference values, or falls outside a range of interference values associated with the current profile. For example, the current profile in use in the SDRs of the one or more devices may be associated with a range of interference between values $x_1$ to $x_2$. If the measured interference is outside the range, i.e., is at a selected level that triggers the need for profile change, then the controller initiates actions for utilizing a different MAC profile for the one or more devices that are using the current profile in network 100.

The selected values that trigger profile change may include values either above or below the range of the current profile. If the selected value is below the range of the current profile, the trigger for profile change would be caused by there being less interference in the RF environment than is defined for the current profile. If the selected value is above the range of the current profile, the trigger for profile change would be caused by there being more interference in the RF environment than is defined for the current profile.

If a need for profile change has been triggered, at 206, the interference is characterized. The characterization may be performed by associating the interference with an interference category of a plurality of interference categories. The categories may be configured in categories comprising levels of interference or categories comprising ranges of levels of interference ranging from low levels of interference to high levels of interference. The process then moves to 208. At 208, database 132 is accessed. Database 132 may be configured to store a plurality of profiles where each profile of the plurality of profiles may be associated with an interference category of the plurality of interference categories. At 210, a new profile may be determined by determining the new profile from the interference's or interference measurement's associated interference category and its associated profile. At 212, controller 102 initiates use of the new profile in the one or more devices. Controller may initiate the use of the new profile by initiating the sending of an executable file that includes profile code for changing operating behavior of the client devices 118-128 or APs 110-116.

In alternative implementation of FIG. 2, the operation 208 of accessing the database may be omitted from the process or performed only intermittently when a profile change is required. In this implementation, rather than accessing a new profile from database 132, the controller may be configured with the capability to dynamically create a profile based on interpretation of a range of measures, such as measurements of interference such as signal to noise ratio (SNR) or measurements related to transmission signal quality, such as bit error rate (BER), packet error rate (PER), or other measurements. This could also include measurements of the duty cycle of the interference. Another implementation may include database 132 with a number of pre-defined alternate profiles in combination with network capability to dynamically create new operating profile by modifying one or several operating parameters in response to the current RF environment. When a new profile is created the new profile maybe configured in database 132 for future use.

Figure 3:
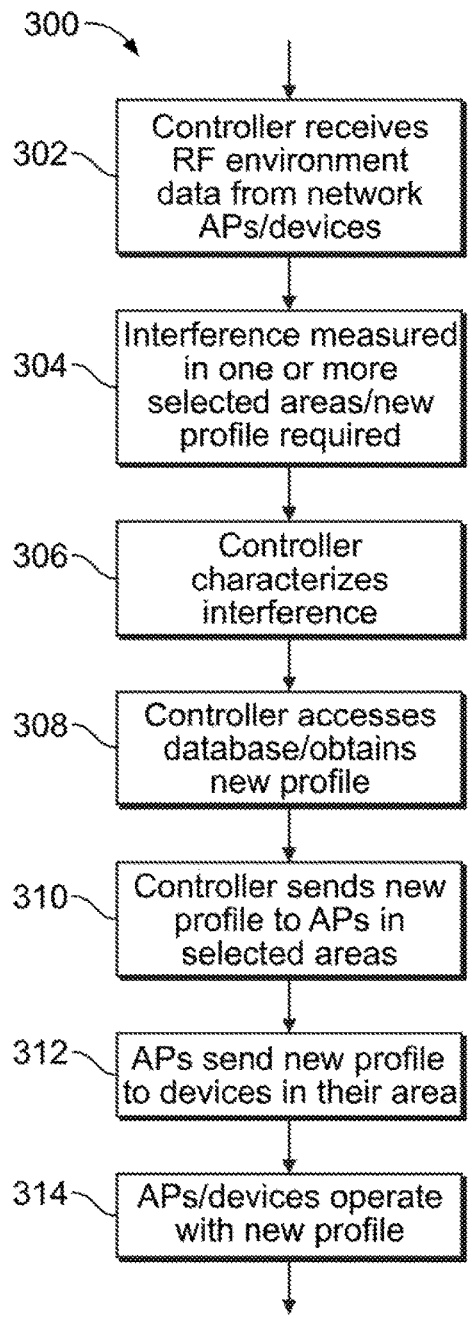
FIG. 3 is a flow diagram showing further example operations for modifying operating profiles in a wireless network according to an implementation.

Referring now to FIG. 3, therein is a flow diagram 300 showing further example operations performed by devices in a wireless network for modifying operating profiles. FIG. 3 illustrates a possible implementation of FIG. 2 in a network, such as network 100. At 302, during ongoing operation of network 100, controller 102 receives RF environment data comprising data from one or more of client devices 118-128 or APs 110-116 that are operating in network 100. The RF environment data may be, for example, measurements of SNR or measurements related to transmission signal quality, such as BER, PER, or other data indicative of a level of interference in network 100. The RF environment data may include measurements of the duty cycle of the interference to obtain a measurement metric that indicates the aggressiveness of the interference and that it is from a source outside the network 100.

As another example, information on back-off behavior of client device 118-128 in network 100 may be used as an indicator of interference. The measurements may comprise values that are averaged over a time period and may be data in any form that provides an indication of network performance or transmission/reception quality degradation, or a level of interference in network 100. In an implementation, the RF environment data may comprise data for the RF environment of the network 100 as a whole. In another implementation the RF environment data may be grouped into subsets of data, with each subset of the data associated with information about individual RF environments in network 100. In this implementation the controller may consider the coverage areas of each AP 110-116, and the devices operating within those coverage areas, as being in separate individual RF environments. In this case controller 102 may handle profile modification in different areas covered by a particular AP, or group of APs, of APs 110-116, within network 100 differently. Measurements of the RF environment for interference determination may be performed at one or more of client devices 118-128, or at one or more of APs 110-116 and sent to controller 102. In another implementation controller 102 may be coupled to one or more dedicated measurement devices located throughout network 100 for measuring RF environment data.

At 304, controller 102 determines and detects, from the RF environment data, that there is interference in network 100 and that new device profiles are required in one or more selected areas of network 100. The determinations of 304 may be performed as described for operations 202 and 204 of FIG. 2. In an implementation in which the RF environment data comprises interference data for the RF environment of the network 100 as a whole, a determination that the interference is at the selected level will trigger a need for profile change in each of the client devices 118-128 and/or APs 110-116 operating in network 100. In an implementation in which the RF environment data comprises subsets of measurements, with each subset of the measurements associated with information about individual RF environments in network 100, a determination may be made that the interference is at the selected level only in a particular RF environment of network 100. This determination may trigger a need for profile change only for client devices and AP/APs operating in that particular RF environment of network 100.

In an implementation, controller 102 may make the determinations at 304 as to whether a profile change is required based on a comparison of the RF environment data with information about the current profile or profiles with which the client devices 118-128 and APs 110-116 are currently operating. The current profile may be associated with a range of interference values. If the measured interference is within the range of interference associated with the current profile or profiles, controller 102 determines that no profile change is required. If the measured interference is a value below or above the range associated with the current profile controller 102 determines that profile change is required for devices operating with that current profile. If the individual RF environments of APs 110-116 are being considered separately by controller 102 for profile modification, the profile used by the devices in each individual RF environment may be associated with a separate range of interference that is compared separately with the measured interference. The use of information on current device profiles allows controller 102 to keep track of changes in device profiles and to manage device profiles based on the history of prior profile changes.

At 306, controller 102 characterizes the interference in the one or more RF environments in which the measured level of interference triggers a profile change. The characterization may be performed by associating the RF environment data with an interference category of a plurality of interference categories. The categories may be configured to be translatable to associated device profiles that are stored in database 132 and configured in a plurality of categories ranging from low levels of interference to high levels of interference. For example if the RF environment data is a SNR measurement of a value of X, that interference measurement may be categorized into a selected category of a plurality of categories where the selected category comprises a range of values that includes a SNR of X. The other categories of the plurality of categories may comprise ranges of SNR, both above and below the range of the selected category into which a SNR of X fits. Each of the plurality of categories of SNR may also be translatable to an associated device profile in database 132. In another example, if the RF environment data is a BER measurement of a value of Y, that interference measurement may be categorized into a selected category of a plurality of categories where the selected category comprises a range of values that includes a BER of Y. The other categories of the plurality of categories may comprise ranges of BER, both above and below the range of the selected category into which a BER of Y fits. Each of the plurality of categories of BER may also be translatable to an associated device profile in database 132.

In a further example, if the RF environment data is a back-off related measurement or value, that measurement or value may be categorized into a selected category of a plurality of categories where the selected category comprises a range of values that includes that particular back-off related measurement or value. For example, the back-off value may comprise a value of the average number of times a device in a particular RF environment backs off over a certain time period, or a value of the average amount of time a device in the particular RF environment spends in back-off over a certain time period. The other categories of the plurality of categories may comprise ranges of back-off values, both above and below the range of the selected category into which the back-off value of the RF environment fits. Each of the plurality of categories of back-off values may also be translatable to an associated device profile in database 132.

At 308, controller 102 accesses database 132 in data center 130 by communicating RF environment information with data center 130. Controller 102 may communicate the information by sending a query to data center 130. The query may include categorized interference data of the RF environment and the data center may then determine the new device profile from the categorized interference data. In alternative implementations, the query may include the selected level of interference measured in the RF environment without categorization information and the data center may determine the new device profile directly from the selected level of interference. In another alternative, the controller 102 may be configured to determine itself which profile it needs and the query may include information associated with the RF environment m the form of a request for a specific profile.

After communicating the RF environment information with data center 130 controller 102 then obtains the new device profile or profiles from data center 130 for use by devices in network 100. If the individual RF environments of APs 110-116 are being considered separately by controller 102 for profile modification, controller 102 may obtain several new profiles each for use in one of the individual RF environments of APs 110-116. In various implementations the new profiles may comprise profiles implementing different MAC layer configurations or different baseband configurations, for example, changes to channel bandwidth or the forward error correction (FEC) coding scheme that is used for AP or device transmissions. As another alternative, the new profiles may comprise profiles implementing different client device Wi-Fi back-off behavior, such as for example reducing the amount of back off, for example by using a linear instead of an exponential back off rate for more aggressive Wi-Fi transmissions in the presence of interference. In other implementations the new profiles may comprise combinations of modifications to different layers or aspects of device behavior, such as for example, a new profile combining a new MAC layer configuration with a new FEC scheme and/or a new back-off behavior. The new profiles may each comprise an executable file that may be downloaded by controller 102 from profile database 132 of data center 130.

At 310, controller 102 initiates sending of the new profiles obtained from data center 130 to the APs of the areas in which the need for profile change was determined. For example, in one implementation, when the RF environment of network 100 is being considered as a whole, controller 102 may send the new profiles to each AP of APs 110-116. At 312, each AP may then send the appropriate device profile to the devices of devices 118-128 operating within its coverage area. In another implementation, controller 102 may determine that interference requiring profile modification only exists in one particular section of a network covered by one AP, for example AP 116. At 312, controller 102 may then initiate sending of modified profiles only to AP 116 and devices, for example devices 126 and 128, operating in that particular section of the network. In one implementation of operations 310 and 312, each device receiving a new profile acknowledges to each sending device that all profile bits were correctly received before communications in the network are switched to the new profiles.

At 314, the devices of devices 118-128 that have been sent new profiles begin operating according to the new profiles. If profile change is necessary in the APs to accommodate the new device profiles, the appropriate devices of APs 110-116 also begin operation using new profiles. SDR control programs in the devices implement the executable code comprising the new profile and configure device transceivers and protocol control programs to operate according to the new profile.

The Architecture for implementing the solution in a network such as a Wi-Fi network may include separately implemented servers or computer devices comprising the controller and the data center having a database of profiles as shown in FIG. 1. Alternately, all of the controller may be implemented in a device, such as a client device or AP. Portions of the controller functions may also be distributed and implemented in one or more devices, such as a server, APs, or client devices operating within the network or remote from the network. The data center may also be implemented in one device such as a server, computer device, a client device or AP. Portions of the controller functions may also be distributed and implemented in one or more devices operating within or remote from the network. In one implementation a Regional Data Center may serve to maintain a database of profiles for use by controllers in multiple networks. The Regional Data Center may include a database of profiles that may be maintained and updated according to standards organizations' inputs on changing technical specifications or inputs based on technical research on RF environments as RF environments in the region change.

Figures 4, 5:
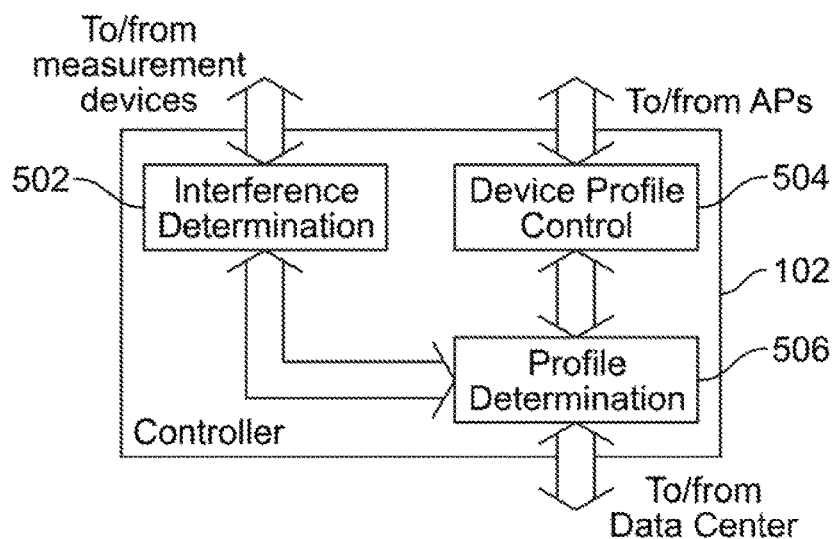
FIG. 4 is a diagram showing an example profile database.
FIG. 5 is a simplified block diagram showing example functions in a controller for implementing profile modification.

Referring now to FIG. 4, therein is a diagram showing example profiles 400 that may be implemented in a database, such as database 132 of FIG. 1. Profiles 400 may comprise MAC profile types 402 that include a number, N, of files designated MAC-1 to MAC-N, forward error correction (FEC) profile types 404 that include a number, N, of files designated FEC-1 to FEC-N, bandwidth profile types 406 that include a number, N, of files designated BW-1 to BW-N, and Back-off profile types 408 that include a number, N, of files designated Backoff-1 to Backoff-N. Each of files MAC1-MACN, FEC-1 to FEC-N, BW-1 to BW-N, and Backoff-1 to Backoff-N may be an executable file in the form of code compatible with SDRs implemented in client devices 118-128 and/or APs 110-116 operating in network 100. In various implementations a database, such as database 132, may be implemented having one or more of MAC profiles, FEC profiles, Bandwidth profiles, or Back-off profiles. For example, in an implementation, database 132 may include only one type of profile such as MAC profiles only, FEC profiles only, Bandwidth profiles only, or Back-off profiles only. In other implementations database 132 may include more than one of the types of profiles or all four types of profiles. In another implementation the profiles may be profiles that include code for modifying multiple types of behavior with one profile, for example, a profile may be for modifying both MAC and back-off behavior.

Each of files MAC-1 to MAC-N, FEC-1 to FEC-N, BW-1 to BW-N, and Backoff-1 to Backoff-N may include two sub files, one to configure one or more of client devices 118-128, and a counterpart file to configure the behavior of appropriate APs of 110-116 to match the profile change of devices 118-128. The counterpart files may be used together in the embodiments so that the APs remain compatible with changes in device behavior. Each of MAC-1 to MAC-N, FEC-1 to FEC-N, BW-1 to BW-N, and Backoff-1 to Backoff-N may also be associated with a category or range of interference ranging, respectively, from lower interference levels to higher interference level. For example, in an embodiment according to FIG. 3 in which database 132 includes only the MAC profiles, each of MAC-1, MAC-2, . . . MAC-N, may be associated with a range of interference from a plurality of ranges of interference. MAC-1 may be associated with a first range of levels of interference lower than levels of a second range associated with MAC-2. The second range associated with MAC-2 may be a range of levels of interference lower than levels of interference in a third range that is associated with MAC-3, and so on up to a range N that is associated with MAC-N. In an implementation, each of MAC-1 to MAC-N and its associated range 1-range N may be respectively assigned to a category 1-N. In other implementations, each of the profile types FEC-1 to FEC-N, BW-1 to BW-N, and Backoff-1 to Backoff-N, that are used may also be associated with a category or range 1-N of interference ranging, respectively, from lower interference levels to higher interference levels. When more than one profile type is used the values within the ranges 1-N may or may not overlap.

While FIG. 4 shows four example profile types, other profiles used in embodiments of the disclosure may include any other type of profiles that configure and implement any type of device behavior at any level or at any layer in a network.

The MAC profiles 402 may be a function of whether the interference is aggressive and from another network, for example, whether the interference is intentional, or caused by traffic load over the same network in which the devices are operating. In the aggressive interference case, measurements of the duty cycle of the intentional interference may be performed to obtain a metric that indicates the aggressiveness of the interference. In this case, the MAC profiles 402 for the higher levels of interference may be configured to be conservative on spectrum sharing. For example, a contention sensed multiple access (CSMA) scheme with low delay exponential back-off or low delay linear back-off may be used in higher levels of interference from external networks. In lower levels of interference, higher delay exponential back-off or higher delay linear back-off may be used. Another MAC profile 402 implementation for different levels of interference may use a CSMA scheme with a point coordination function (PCF) or hybrid coordination function controlled channel access (HCCA) mode enabled to give priority to one device over another, or enabled to adjust its scheduling mechanism to account for higher or lower levels of interference. The PCF/HCCA mode may be also be disabled in MAC profiles 402 used for lower levels of interference.

In another example implementation, forward error correction (FEC) profiles 404 may be configured to account for intra-network as well as external (inter-network or heterogeneous network) interference. The FEC profiles 404 may be configured to achieve a retries threshold (impacting delays) and packet error rate (PER) threshold depending on interference in an RF environment. Increased error protection may be configured for when aggressive interference is present. This may involve a tradeoff in network transmission quality.

Other examples of profiles that may be used include bandwidth profiles 406 that cause devices to transmit on lower bandwidth channels when interference from an external network is within the lower interference ranges and on higher bandwidth channels when the interference is within the higher interference ranges. Additionally, backoff profiles 406 may be utilized to implement changes in delay parameters for back-off functions that decreases use of back-off by a device as interference increases in a network and allows increased use of back-off as interference falls within the lower interference ranges.

In implementations in which the profiles are categorized by categories in the database, devices accessing the database, such as a network controller 102, may be configured to categorize interference measurement and access the profiles by communicating a desired category for a profile to a data center, such as data center 130. In another implementation, a network controller may send RF environment data or interference measurements directly to a data center. The data center may then select an appropriate profile for network controller 102 by associating the RF environment data with a range and profile in the database.

In various implementations the ranges of interferences for each category associated with a profile in the database may be defined by the type of measurements that are included in the RF environment data processed by controller 102. For example if the RF environment data is a SNR measurement of a value of X, that interference measurement may be categorized into a selected category of a plurality of categories 1-N where the selected category comprises a range of values that includes a SNR of X. The other categories of the plurality of categories may comprise ranges of SNR, both above and below the range of the selected category into which a SNR of X fits. Each of the plurality of categories of SNR may also be translatable to an associated device profile in database 132. In another example, if the RF environment data is a BER measurement of a value of Y, that interference measurement may be categorized into a selected category of a plurality of categories 1-N where the selected category comprises a range of values that includes a BER of Y. The other categories of the plurality of categories may comprise ranges of BER both above and below the range of the selected category into which a BER of Y falls.

Databases 132 may be configured to include profiles that are relevant to the particular operating protocols being used in network 100. For example, if client devices 118-128 and APS 110-115 are operating according to the 802.11a, 802.11g or 802.11n physical layer standards, data bases 132 may be configured to include the coding profiles FEC-1 to FEC-N. The different coding profiles may be used to change the FEC coding used in network 100 depending on interference in the RF environment. If client devices 118-128 and APS 110-115 are operating according any of the multiple 802.11 physical layer standards that are associated with the 802.11 MAC layer standards, the MAC profiles and Backoff profiles may be implemented in database 132. The different MAC and back-off profiles may be used to change the MAC parameters used in network 100 depending on interference in the RF environment. When interference is at higher levels profiles categorized in the data base for higher interference may be used. When interference is at lower levels profiles categorized in the data base for lower interference may be used.

Referring now to FIG. 5, therein is a simplified block diagram showing representative functions of an example network controller 130 for implementing profile modification in a wireless network. Controller 102 of FIG. 5 may represent, for example, controller 102 as was described in conjunction with the operations of FIG. 3. FIG. 5 shows controller 102 including interference determination function 502, profile determination function 506, and device profile control function 504. The functions shown in FIG. 5 also may be used in alternative embodiments in which the controller comprises a controller distributed throughout the network. In these embodiments the controller functions performed by interference determination function 502, profile determination function 506, and device profile control function 504 of FIG. 5 may be performed, wholly or partially, in any other apparatus or devices in network 100 such as, for example, in any of client devices 118-128, APs 110-116, and/or in data center 130 of network 100. In the various embodiments each of controller 130, devices 118-128, APs 110-116, and/or data center 130 may comprise one or more of appropriate processors, circuitry, or processing units, and memory or storage devices including code that implements the profile modification.

In controller 102 of FIG. 5, interference determination function 502 receives RF environment data associated with one or more RF environments in network 100 as described for operation 302 or FIG. 3. Interference determination function 502 may then determine that the interference is at a selected level in an RF environment in which at least one device is operating according to a first profile and that a new profile is required for the at least one device as described for operation 304 of FIG. 3. If interference determination function 502 determines that a new profile is required, profile determination function 506 then determines a new profile from one of a plurality of profiles based on the determination that interference in the RF environment is at the selected level by communicating with data center 130 as described for operations 306 and 308 of FIG. 3. Device profile control function 504 then initiates use of the new profile for operation of the at least one device by downloading and communicating the new profile to the AP or APs managing the RF environment in which the at least one device is operating, as described for operations 310 and 312 of FIG. 3.

Referring now to FIG. 6, therein is a simplified block diagram of an example mobile client device 600 which may be implemented in network 100 to perform operations according to FIGS. 2 and 3. Client device 600 represents a possible implementation of any of client devices 118-128 or any other device that may operate in network 100, according to the embodiments of the disclosure. Client device 600 may include user interfaces (UIs) 618 which may include any type of interface, for example, a touch screen/keypad, microphone, speaker or camera which receive inputs and provide outputs to and from device 600. Client device 600 may also include other input/outputs (Other I/O) 616 for providing interface to other type devices. Other I/O 616 may include, for example, interfaces for any function that may transmit and receive data in network 100. Device 600 includes processing unit 614 and memory 620 which is shown as including program code or instructions for adaptive profile/SDR control programs 626 that perform functions according to the embodiments. Processing unit 614 may comprise one or more processors, or other control circuitry or any combination of processors and control circuitry that provide overall control of client device 600 according to the disclosed embodiments. In some implementations of profile modification, memory 620 may include code comprising profiles 628, which may include past profiles used in client device 600 or a database, or portions of a database, used to provide the functions provided by database 132 in the embodiments of FIGS. 2 and 3. Memory 620 may also include other device applications 624. Memory 620 may be implemented as any type of computer readable storage media in client device 600, including non-volatile and volatile memory. Memory 620 also includes OS programs 622 in the form of code for running the operating system to control the operations of device 600 and application programs 624. Memory 620 also may include data such as media data, camera photos and videos, contact data, calendar data, and other files used in the operation of applications on device. Processing unit 614 may comprise one or more processors, or other control circuitry or any combination of processors and control circuitry. Processing unit 614 provides overall control of client device 600 and the other functional blocks shown in FIG. 6 by implementing instructions and code in memory 620 to provide functions for operation in network 100.

Client device 600 includes transceivers (TRXs) operating in different example frequency bands as shown by 60 GHz Band TRX 602, 2.4 GHz TRX 604, 5 GHx Band TRX 606, 300 MHz Band TRX 608, TVWS Band TRX 610, and cellular band TRX 612. In the embodiments device 600 and its transceivers may be operable to use one or more spectrum allocations that are allowed in each of the designated frequency bands according to the any relevant IEEE 802.11 or any other standard specifications supported by network 100. Also, TRX 610 may use currently available TVWS channels according to requirements and regulations of the geographic area in which network 100 operates. Cellular band TRX 612 may allow device 400 to operate in a cellular system.

In the embodiments, execution of adaptive profile/SDR control programs 626 causes processing unit 614 to implement operations that cause SDR functions of client device 600 to reconfigure device 600. Client device 600 may be reconfigured to operate according to a new profile downloaded to client device 600, or as instructed by controller 102 to use a profile 628 already stored in memory 620. Depending on the type of profile, reconfiguration may include reconfiguring protocol software or code in processing unit 614 and reconfiguring one or more of transceiver 602-612 to operate according to the new profile. Adaptive profile programs may also cause device client device 600 to perform appropriate operations according to FIG. 2 or 3 to provide adaptive profile modification in network 100. Processing unit 614 may also control device 600 to measure RF environment data, such as interference levels and send the RF environment data to controller 102 for use in adaptive profile modification determinations.

Referring now to FIG. 7, therein is a simplified block diagram of an example access point 700 which may be implemented in the network 100 to perform operations according to FIGS. 2 and 3. One or more of access points 110-116 of network 100 may be implemented according to FIG. 7. Access point 700 includes processing unit 704, transceivers 712, and memory/storage 706 that includes code and instructions for adaptive profile/SDR control programs 708. Memory 706 may be implemented as any type of as any type of computer readable storage media, including non-volatile and volatile memory. In some implementations of profile modification according to alternative embodiments, memory 706 may include code comprising profiles 710, which may include past profiles used in devices or a database, or portions of a database, used to provide the functions provided by database 132 in the embodiments of FIGS. 2 and 3. Access point 700 connects to a backend network over interface 702. Processing unit 704 may comprise one or more processors, or other control circuitry or any combination of processors and control circuitry that provide overall control of the access point according to the disclosed embodiments. Transceivers 712 provide the capability for network 100 to communicate with devices, such as devices 118-128, over RF channels according to protocols defined by profiles that may be assigned to devices according to the adaptive profiles of the embodiments.

In the embodiments, execution of adaptive profile/SDR control programs 708 causes processing unit 704 to implement operations that cause SDR functions of AP 700 to reconfigure AP 700. AP 700 may be reconfigured to operate according to a new profile downloaded to AP 700 from controller 102 to remain compatible with profile changes made to client devices operating in the coverage area of AP 700. AP 700 also may be instructed by controller 102 to use a profile 710 already stored in memory 706. Depending on the type of profile, reconfiguration may include reconfiguring protocol software or code in processing unit 704 and reconfiguring one or more of transceiver 712 to operate according to the new profile. Adaptive profile programs 708 may also cause processing unit 704 to control access point 700 to perform appropriate operations according to FIG. 2 or 3 to provide adaptive profile modification in network 100. Processing unit 704 may control access point 700 to receive executable code in the form of new profiles sent from controller 102 and relay appropriate client device profile code to client devices operating within its coverage area. Processing unit 704 may also control access point 700 to measure RF environment data, such as interference levels and send the RF environment data to controller 102 for use in adaptive profile modification determinations.

Referring now to FIG. 8, therein is a simplified block diagram of an example controller 800 which may be implemented in the network 100 to perform operations according to FIGS. 2 and 3. For example, controller 102 of FIG. 1 may be implemented according to controller 800 of FIG. 8. Controller 800 may include a server 804 having processing unit 806, a memory 814, network interfaces 808, and data center interfaces 802. Memory 814 may be implemented as any type of computer readable storage media, including non-volatile and volatile memory. Memory 814 is shown as including adaptive profile control programs 812. Server 804 and processing unit 806 may comprise one or more processors, or other control circuitry, or any combination of processors and control circuitry that provide overall control of controller 800 according to the disclosed embodiments.

Adaptive profile control programs 812, when executed, cause processing unit 806 to control controller 800 to perform operations as shown in FIGS. 2 and 3 for adaptive profile modification in network 100. Controller 800 may access data center 130 through data center interfaces 802 and communicate with APs 110-116 through network interfaces 808. In other implementations processing unit 806 may control controller 800 to provide other functions, for example, in one implementation the functions performed by data center 130 of FIG. 1 may be incorporated into controller 800 and memory 814 may include a profile database.

Controller 800 is shown as including server 804 as a single server. However, server 804 may be representative of server functions or server systems provided by one or more servers or computing devices that may be co-located or geographically dispersed to implement controller 800. The term server as used in this disclosure is used generally to include any computing devices or communications equipment that maybe implemented to perform the adaptive profile control programs functions and processes.

The example embodiments disclosed herein may be described in the general context of processor-executable code or instructions stored on memory that may comprise one or more computer readable storage media (e.g., tangible non-transitory computer-readable storage media such as memory 620, 706 or 814). As should be readily understood, the terms "computer-readable storage media" or "non-transitory computer-readable media" include the media for storing of data, code and program instructions, such as memory 620, 706 or 814, and do not include portions of the media for storing transitory propagated or modulated data communication signals.

Embodiments of adaptive profiles for SDR have been disclosed that include a device comprising one or more processors and memory in communication with the processor, the memory containing code that, when executed, causes the one or more processors to determine that interference is at a selected level in an RF environment in which at least one device is operating according to a first profile, determine, based on at least determining that the interference is at a selected level, a second profile from one of a plurality of profiles, and, initiate use of the second profile for operation of the at least one device. The code may be further executable to cause the one or more processors to determine a second profile by causing the processing unit to access a database, the database comprising a plurality of profiles each associated with one of a plurality of interference categories, and, determine the second profile from the database, wherein, the selected level is in an interference category associated with the second profile. The code may comprise control code and each of the plurality of profiles may comprise executable profile code and the control code may be further executable to cause the one or more processors to initiate use of the second profile by causing the one or more processors to obtain the second profile from the database and initiate transfer of the second profile to the at least one device. The selected level of interference may be value of interference outside a first range of values of interference associated with the first profile. The first and second profiles may define, respectively, a first and second Media Access Control (MAC) layer. The code may be further executable to cause the processing unit to determine that interference in an RF environment is at a selected level by causing the one or more processors to determine that back-off behavior of the at least one device operating according to a first profile has satisfied a selected condition. The first and the second profile may define, respectively, a first and a second back-off parameter. The first and the second profile may define, respectively, a first and a second forward error correction coding (FEC) scheme.

The embodiments also include a device comprising one or more processors and memory in communication with the processor, the memory containing code that, when executed, causes the one or more processors to determine that interference is at a selected level in an RF environment in which at least one device is operating according to a first profile, determine, based on at least determining that the interference is at a selected level, a second profile from one of a plurality of profiles, and, initiate use of the second profile for operation of the at least one device, wherein the selected level may comprise a first selected level and the RF environment may comprise a first RF environment of the wireless network and the code may be further executable to cause the one or more processors to determine that interference in a second RF environment of the wireless network is at a second selected level for a second at least one device operating according to a third profile, determine, based on at least determining that the interference in the second RF environment is at the second selected level, a fourth profile from one of the plurality of profiles, and, initiate use of the fourth profile for operation of the second at least one device. The code may be further executable to cause the processing unit to determine the second and fourth profile by causing the one or more processors to access the database comprising a plurality of profiles each associated with one of a plurality of interference categories, and, determine the fourth profile from the database, wherein the second selected level is in an interference category associated with fourth profile.

The embodiments also further included a device comprising storage configured to store a plurality of device profiles, at least one processor, and memory in communication with the at least one processor, the memory storing code that, when executed, causes the processor to receive a query, the query including information associated with a selected level of interference in an RF environment, determine, based at least on the information in the query, a selected device profile from the plurality of device profiles included in the database; and, initiate a response to the query, the response including the selected device profile. The code may comprise control code and each of the plurality of device profiles may be a media Access Control (MAC) profile in executable code and may be associated with an interference category of a plurality of interference categories, and the control code, when executed, may cause the at least one processor to determine, based at least on the information, a selected device profile by determining, based at least on the information in the query, a selected interference category of the plurality of interference categories, and, determining a selected MAC profile of the plurality of MAC profiles, the selected MAC device profile associated with the selected interference category. The code may comprises control code and each of the plurality of device profiles may be a forward error correction (FEC) profile in executable code and is associated with an interference category of a plurality of interference categories, and the control code, when executed, may cause the at least one processor to determine, based at least on the information, a selected device profile by determining, based at least on the information in the query, a selected interference category of the plurality of interference categories, and, determining a selected FEC profile of the plurality of FEC profiles, the selected FEC profile associated with the selected interference category. The code may comprise control code and each of the plurality of device profiles may be a back-off profile in executable code and may be associated with an interference category of a plurality of interference categories, and the control code, when executed, may cause the at least one processor to determine, based on the information, a selected device profile by determining, based at least on the information in the query, a selected interference category of the plurality of interference categories, and, determining a selected back-off profile of the plurality of back-off profiles, the selected back-off profile associated with the selected interference category. The code may comprise control code and each of the plurality of device profiles may be a channel width profile in executable code and may be associated with an interference category of a plurality of interference categories, and the control code, when executed, may cause the at least one processor to determine, based at least on the information, a selected device profile by determining, based at least on the information in the query, a selected interference category of the plurality of interference categories, and, determining a selected channel width profile of the plurality of channel width profiles, the selected channel, width profile associated with the selected interference category.

The embodiments also further include a computer readable medium comprising instructions stored thereon, that when executed on one or more processors cause the one or more processors to determine that interference is at a selected level in an RF environment in which at least one device is operating according to a first profile, determine, based on at least determining that the interference is at a selected level, a second profile from one of a plurality of profiles, and, initiate use of the second profile for operation of the at least one device. The instructions, when executed, may cause the one or more processors to determine a second profile by accessing a database, the database comprising a plurality of profiles each associated with one of a plurality of interference categories, determining the second profile from the database, wherein the selected level is in an interference category associated with the second profile. The second profile may be a medium access control (MAC) layer profile comprising code executable on the at least one device. The second profile may be a forward error correction (FEC) profile comprising code executable on the at least one device. The second profile may be a back-off profile comprising code executable on the at least one device. The second profile may be a channel width profile comprising code executable on the at least one device.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A network controller comprising:
one or more processors; and
memory in communication with the one or more processors, the memory containing code that, when executed, causes the one or more processors to:
determine that interference is at a selected level in an RF environment of a contention based multiple access network in which at least one device is operating according to a first profile, wherein the at least one device comprises a software defined radio (SDR), wherein the first profile comprises a first executable file that is compatible with the SDR, and wherein the first profile includes a first value of at least one contention based multiple access parameter comprising a first time delay for back-off of packet transmissions from the at least one device;
determine, based at least in part on the determination that the interference is at the selected level, a second profile from one of a plurality of profiles, wherein the second profile comprises a second executable file that is compatible with the SDR, and wherein the second profile includes a second value of the at least one contention based multiple access parameter comprising a second time delay for back-off of packet transmissions from the at least one device; and
send the second executable file to the at least one device in the contention based multiple access network in response to the determination that the interference is at the selected level.

2. The network controller of claim 1, wherein the code is further executable to cause the one or more processors to determine the second profile by causing the one or more processors to:
access a database, the database comprising the plurality of profiles each associated with one of a plurality of interference categories; and
determine the second profile from the database, wherein the selected level is in an interference category associated with the second profile.

3. The network controller of claim 1, wherein the code is further executable to cause the one or more processors to determine that interference in the RF environment is at the selected level by causing the one or more processors to determine that back-off behavior of the at least one device operating according to the first profile has satisfied a selected condition.

4. The network controller of claim 1, wherein the at least one contention based multiple access parameter further comprises a parameter associated with a priority of the at least one device for access to the multiple access network.

5. The network controller of claim 1, wherein the at least one contention based multiple access parameter further comprises a parameter for a scheduling mechanism for a contention sensed multiple access scheme.

6. The network controller of claim 1, wherein the selected level comprises a first selected level and the RF environment comprises a first RF environment of a wireless network and the code is further executable to cause the one or more processors to:

determine that interference in a second RF environment of the wireless network is at a second selected level for a second at least one device operating according to a third profile;

determine, based on at least determining that the interference in the second RF environment is at the second selected level, a fourth profile from one of the plurality of profiles; and initiate use of the fourth profile for operation of the second at least one device.

7. The network controller of claim 6, wherein the code is further executable to cause the one or more processors to determine the second and fourth profile by causing the one or more processors to:

access the database comprising the plurality of profiles each associated with one of a plurality of interference categories; and determine the fourth profile from the database, wherein the second selected level is in an interference category associated with the fourth profile.

8. A data center comprising:

storage configured to store a plurality of device profiles;

at least one processor; and memory in communication with the at least one processor, the memory storing code that, when executed, causes the processor to:

receive a query from a network controller, the query including information associated with a selected level of interference in an RF environment of a contention based multiple access system in which at least one device is operating according to a first device profile, wherein the first device profile includes a first value of at least one contention based multiple access parameter comprising a first time delay for back-off of packet transmissions from the at least one device;

determine, based at least on the information in the query, a second device profile from the plurality of device profiles included in a database, wherein the second device profile includes a second value of the at least one contention based multiple access parameter comprising a second time delay for back-off of packet transmissions from the at least one device; and send a response to the query to the network controller, the response including the second device profile for operation of the at least one device in the contention based multiple access system.

9. The data center of claim 8, wherein the code comprises control code and the each of the first and second profiles is a multiple access-profile of a plurality of contention based multiple access profiles in executable code and is associated with an interference category of a plurality of interference categories, and the control code, when executed, causes the at least one processor to determine, based at least on the information, the second device profile by:

determining, based at least on the information in the query, a selected interference category of the plurality of interference categories; and determining the second device profile of the plurality of contention based multiple access profiles based on the second device profile being associated with the selected interference category.

10. The data center of claim 8, wherein the information in the query includes information on back-off behavior of the at least one device operating according to the first profile and the code further causes the at least one processor to determine the second profile by causing the at least one processor to determine that the back-off behavior of the at least one device operating according to a first profile has satisfied a selected condition.

11. The data center of claim 8, wherein the at least one contention based multiple access parameter further comprises a parameter associated with a priority of the at least one device for access to the multiple access system.

12. A network controller comprising:

one or more processors; and memory in communication with the processor, the memory containing code that, that when executed on one or more processors cause the one or more processors to:

determine that interference is at a selected level in an RF environment of a multiple access system in which at least one device is operating according to a first profile, wherein the at least one device comprises a software defined radio (SDR), wherein the first profile comprises a first executable file that is compatible with the SDR, and wherein the first profile includes a first value of at least one contention based multiple access parameter associated with a scheduling mechanism for packet transmissions in a multiple access scheme for the at least one device;

determine, based at least in part on determining that the interference is at the selected level, a second profile from one of a plurality of profiles, wherein the second profile comprises a second executable file that is compatible with the SDR, and wherein the second profile includes a second value of the at least one contention base multiple access parameter associated with a scheduling mechanism for packet transmissions in a multiple access scheme for the at least one device; and send the second executable file to the at least one device in the multiple access system in response to determining that the interference is at the selected level.

13. The network controller of claim 12, wherein the at least one device comprises a first device and the scheduling mechanism for the multiple access scheme comprises a point coordination function for giving a priority to the first device for access to the multiple access system over a second device.

14. The network controller of claim 12, wherein the at least one device comprises a first device and the scheduling mechanism for the multiple access scheme comprises a hybrid coordination function controlled channel access mode for giving a priority to the first device for access to the multiple access system over a second device.

15. The network controller of claim 12, wherein the first and second profiles further include, respectively, a first and second time delay for back-off of packet transmissions from the at least one device.

16. The network controller of claim 12, wherein the at least one contention based multiple access parameter comprises a parameter associated with a priority of the at least one device for access to the multiple access system.

* * * * *